Sept. 21, 1948.  M. SOUDERS, JR., ET AL  2,449,793
EXTRACTION OF UNSATURATED HYDROCARBONS AND
SELECTIVE SOLVENT THEREFOR
Filed Sept. 22, 1947
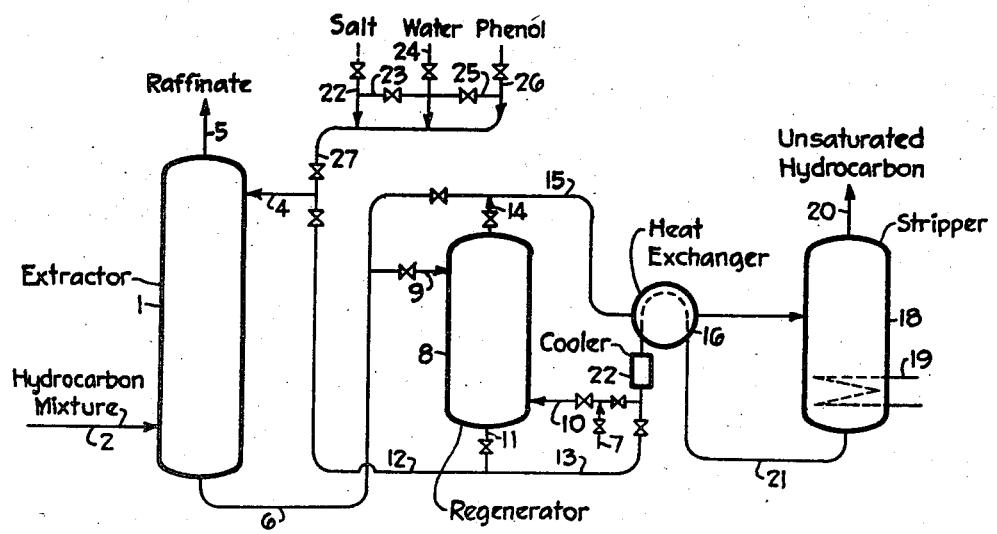
Inventors: Mott Souders, Jr.
Frederic A. French
By their Attorney: James Todosevic Patented Sept. 21, 1948

2,449,793

UNITED STATES PATENT OFFICE 2,449,793

EXTRACTION OF UNSATURATED HYDROCARBONS AND SELECTIVE SOLVENT THEREFOR

Mott Souders, Jr., Piedmont, and Frederic A. French, Berkeley, Calif., assignors to Shell Development Company, San Francisco, Calif., a corporation of Delaware Application September 22, 1947, Serial No. 775,494

19 Claims. (Cl. 260—677)

This invention relates to the separation and concentration of unsaturated from less unsaturated hydrocarbons, and is particularly applicable to the separation and concentration of olefins from fluid hydrocarbon mixtures.

Processes for separating olefins from hydrocarbon mixtures by contacting the mixtures with solutions of heavy metal salts capable of forming reversible complexes with said olefins, whereby said olefins are extracted by said solutions, have been described. The presence of a neutral water-soluble organic compound, such as ethylene glycol, has been stated to increase olefin absorption. However, the presence of the heretofore described solutizers, as has been found, does not increase absorption, while maintaining high selectivity, to the extent desired for commercial operations.

It is therefore an object of the present invention to provide an improved process for the separation of unsaturated hydrocarbons from fluid hydrocarbon mixtures containing them. Another object is to provide an improved process for separating olefins from olefinic cracked hydrocarbon mixtures. A still further object is to separate olefins, in substantially pure form, from other hydrocarbons. Still another object is to provide for the storage and transportation of normally gaseous unsaturated hydrocarbons. Further objects and advantages of the present invention will be readily apparent from the following description.

It has now been found that solutions of silver salts of sulfonic acids, such as silver phenolsulfonate, in phenol and water or ethylene glycol absorbs surprisingly large amounts of unsaturated hydrocarbons to the substantial exclusion of saturated hydrocarbons. The present invention, therefore, provides an improved method of separating and concentrating unsaturated hydrocarbons of high purity from hydrocarbon mixtures containing them. There may be some doubt as to whether the absorption of unsaturated hydrocarbons, as herein described, is physical or due to the formation of a complex material between the unsaturated hydrocarbon and one or more components of the solution, and it is not desired that the present invention be limited by any theory relative thereto. By "absorption," "extraction," and terms of similar import, as used herein, is meant the taking up of the unsaturated hydrocarbon by the solution irrespective of the exact mechanism thereof.

The present invention provides a process for the separation and concentration of unsaturated hydrocarbons from fluid mixtures containing them, which process comprises contacting said mixture containing unsaturated hydrocarbons with a solution of a silver salt of a sulfonic acid in water and phenol, thereby absorbing or dissolving the unsaturated hydrocarbon in said solution, and separating the resulting solution containing the unsaturated hydrocarbon from the remaining unabsorbed components of said mixture.

The present invention may be employed in connection with the separation and concentration of many different unsaturated hydrocarbons from a variety of fluid mixtures containing them. The term "fluid," as used herein, is meant to include both gases and liquids. For example, in one embodiment, the invention may be employed for the separation of olefins such as ethylene, propylene and butylene from gaseous hydrocarbon mixtures, or such gaseous mixtures may be liquefied as by compression and the olefins separated from the liquefied mixture. Another embodiment of the present invention contemplates the separation of normally liquid unsaturated hydrocarbons, such as pentene, hexene, heptene, cyclopentene, cyclohexene, and the like from liquid mixtures containing them. The process of the invention may also be used to separate aromatic compounds containing an unsaturated aliphatic side chain from the corresponding saturated compound, the aromatic ring being considered to be saturated in the sense of the term as used herein and in the appended claims, or from other saturated compounds, such as the separation of styrene from ethyl benzene. Unsaturated hydrocarbons may also be separated from nonhydrocarbons, such as thiophene, furan, pyrrole, ethers, thioethers, their derivatives, and the like, in accordance with the present invention. A further application of the present invention is the separation and concentration of unsaturated from less unsaturated hydrocarbons such as the separation of cyclopentadiene from cyclopentene, or of butadiene from butylene.

The present invention is especially applicable to the separation of olefins from gasoline obtained by thermal or catalytic cracking of various petroleum oils, such as crudes, residues, distillates or gases. While olefinic mixtures of hydrocarbons of various molecular weights may be treated in accordance with the present invention, mixtures of hydrocarbons having relatively small numbers of carbon atoms to the molecule, i. e., relatively low molecular weight hydrocarbons, such as for example hydrocarbons of from 2 to 8 carbon atoms, are especially suitable for employment therein. Thus, for example, the process of the present invention may be used to treat mixtures of hydrocarbons having from about 2 to 8 carbon atoms and containing the desired olefins, which mixtures may be obtained by the vapor phase cracking of petroleum oils.

In accordance with the present invention a hydrocarbon fluid containing one or more unsaturated hydrocarbons, such as olefins, is contacted with a solution containing a silver salt of a sulfonic acid, phenol, and water or ethylene glycol. It has been found that such solutions absorb surprisingly large amounts of olefins. For example, such solutions absorb up to about 25% or more of their own volume of 5 carbon atom olefins, whereas silver nitrate solutions solutized only with ethylene glycol, for example, absorb only about 4% of their volume, while unsolutized aqueous solutions of silver nitrate absorb only about 1 to 2% of their volume. Other olefins may be absorbed to an even greater extent, with the superiority of the phenol solutized solution remaining markedly predominant.

In carrying out the process of the present invention considerable latitude is permissible in the composition of the absorbing solution. Best results will be obtained, however, if the limits described below are observed. When silver phenolsulfonate, a preferred silver salt of a sulfonic acid of the present invention, is employed, it is preferred to employ the silver salt sulfonate and phenol in such quantities that they are present in weight ratio of the silver salt to phenol of from about 0.3 to about 4, and in most instances excellent results are achieved when said ratio is from about 0.6 to about 2, while the water concentration may advantageously be from about 3% to about 50% by weight of the absorbing solution, and preferably from about 5% to about 30% by weight. The quantity of water present may be varied, but is preferably kept as small as is consistent with the solubility of the silver sulfonate salt. For example, with a weight ratio of the silver salt to phenol of 1, the quantity of water present may advantageously be from about 15% to about 20% by weight, and preferably from about 15% to about 17% by weight. As the silver salt sulfonate to phenol ratio is decreased, the water concentration may be decreased, e. g., at a ratio of 0.5, the water concentration may advantageously be about 7% and high absorption of olefins obtained. Even though selectivity for olefins may decrease at relatively low water concentrations, in many instances the decrease in selectivity is negligible. Conversely, if the silver salt sulfonate to phenol weight ratio be increased, the water concentration should also be increased, so that at a ratio of 2, the water concentration may advantageously be from 29 to about 34% by weight. In the absorbing solutions of the present invention the water may be partly or completely replaced with ethylene glycol, in which case the concentration of ethylene glycol, by weight, should be somewhat greater than the water it replaces, but the limits are not substantially changed. For example, where water is completely replaced by ethylene glycol, at a silver phenolsulfonate to phenol weight ratio of 0.3, the percent by weight of ethylene glycol present may advantageously be about 15. The presence of minor quantities of free sulfonic acid in the extracting solvent does not deleteriously affect the present process, and in many instances may increase the stability of the extracting solvent.

In the preceding description of the optimum compositions for the extracting solution of the present invention, silver phenolsulfonate is described as a preferred silver salt of a sulfonic acid for use therein. Silver salts of sulfonic acids, and especially those which are substantially water soluble, are generally suitable for use in the present invention. As illustrative of other silver salts which may be employed in accordance with the present invention, may be mentioned especially the silver salts of sulfonated aromatic compounds, such as the silver salts of sulfonated benzene (i. e., benzene sulfonic acid), the toluenes, toluidines, xylidines and xylenols, naphthalene and derivatives thereof, such as the naphthylamines, naphthols, and the like, and their homologues. The polysalts of aromatic compounds are also within the scope of the present invention, i. e., two or more sulfonic acid radicals may be introduced on the aromatic nucleus, and the di- or poly silver salt thereof prepared, such as the disilver salt of 1,5-naphthalenedisulfonic acid. In general, sulfonation of such compounds, as by sulfuric acid, oleum, sulfur dioxide or trioxide, etc., follows the usual rules of orientation relative to the positions of the substituent groups on the aromatic nucleus, and, for the purposes of the present invention, the relative positions of the groups on the aromatic nucleus are largely immaterial. Thus, for example, silver phenolsulfonate may be the ortho, meta, or para compound, or mixtures thereof, and the term "silver phenolsulfonate," is meant to include the ortho, meta and para compounds, and mixtures thereof. The silver salts of aliphatic sulfonic acids may also be employed, such as the silver salts of methylsulfonic, isothionic, hydroxypropanesulfonic, beta aminoethane sulfonic, etc., acids. The aromatic and aliphatic acids, above illustrated, may contain substituents, such as the nitro and carboxyl groups, but of course such substituents should not adversely affect the solubility relationships of the system.

The silver salts employed in the process of the present invention may be prepared by any convenient means, such as by sulfonation of an aromatic compound with concentrated sulfuric acid or oleum, removing a portion of the water of reaction, if desirable, preferably by means of a vacuum, and treating with a silver salt, such as silver carbonate, to form the desired silver salt. If desired, the salt may be purified, e. g., by recrystallization, but the small amounts of the usual impurities of such preparations do not significantly adversely affect the process of the present invention. Also, in place of or in addition to ethylene glycol, other substantially neutral polar liquids which are non-reactive with the silver sulfonate salt may be employed, such as propylene glycol, the butylene glycols, polyethylene glycol, other glycols, etc.

Any suitable type of apparatus may be employed in carrying out the process of the present invention for effecting the desired separation, which may be adapted to batch, intermittent, or continuous operation. After contacting the fluid hydrocarbon with the absorbing solution, the raffinate and extract phases are separated, and the unsaturated hydrocarbon recovered from the extract. Recovery of the unsaturated hydrocarbon and regeneration of the extracting solution may be conveniently accomplished in one operation, such as by heating or reducing the pressure, or both in order to distill off the absorbed unsaturated hydrocarbon, or by extraction of the unsaturated hydrocarbon with a second solvent which is substantially immiscible in the extracting solvent, and which may be separated from the unsaturated hydrocarbon, for example, by distillation. Suitable second solvents, for example, are liquid, relatively higher molecular weight saturated hydrocarbons, or mixtures thereof, such as n-octane, n-nonane, n-decane, their isomers and homologues, mixtures thereof, and the like, which may be employed for olefin extraction in most instances.

The optimum temperature to be employed in the extraction step varies with the particular compound to be treated, and may range up to about 150° F. or more, but in most instances temperatures below 70° F., and particularly those in the range of from about 32 to about 80° F. are suitable. For example, on contacting a mixture of 5 carbon atom olefins and paraffins with a solution containing 31.9% by weight silver phenolsulfonate, 51.9% by weight phenol, and 16.2% by weight water, at 30° F. the solution absorbed olefins to an extent of about 8% of its volume, at 50° F. about 7% and at 70° F. about 6.5% of its volume. At the relatively lower temperatures less phenol will be lost to the raffinate phase, but in any event such loss is usually negligible. In general, atmospheric pressures are contemplated for use in the unsaturated hydrocarbon absorption step of the process of the present invention, especially where the fluid hydrocarbon being treated is a liquid under the conditions of the process, but sub- or super-atmospheric pressures may be employed where desirable.

As illustrative of a preferred embodiment of the present invention, a mixture of an olefin and paraffins obtained from the thermal or catalytic cracking of a petroleum oil, wherein preferably the olefin contains from about 2 to 8 carbon atoms, or mixtures thereof, is contacted with a solution containing a water soluble silver salt of a sulfonated aromatic compound, water, and phenol, containing the silver salt and phenol in quantities such that the weight ratio of the silver salt to phenol is from about 0.3 to about 4, and preferably from about 0.6 to about 2, and containing from about 3% to about 50% by weight of water, and preferably from about 5% to about 30% by weight of water. The volume of hydrocarbon per volume of extracting solution employed may be varied considerably, the optimum value depending largely on the composition of the hydrocarbon mixture and the various operating conditions, but in most instances the volume ratio of hydrocarbon to extracting solution may be from about 0.1 to about 1. The temperature of the extraction step is preferably within the range of from about 32 to about 80° F., but the increase of absorption with decrease in temperature is not marked, and hence the economics of the process will usually dictate the use of ambient or atmospheric temperature. After contacting the hydrocarbon and extracting solution, whether the process be of batch, intermittent or continuous type, the raffinate and extract phases are separated, the olefins recovered from the extract phase, preferably by distillation or solvent extraction, and the regenerated extracting solution recycled in the process.

The present invention may be better understood from a consideration of the accompanying flow diagram which represents an embodiment thereof, wherein a fluid hydrocarbon mixture containing the unsaturated hydrocarbon(s) to be separated is introduced into an extractor 1 (provided for intimately contacting counterflowing immiscible fluids) via line 2, while the extracting solution (solvent) is introduced into said extractor via line 4. The hydrocarbon(s) mixture passes upward in countercurrent flow to the extracting solution with the raffinate leaving the extractor via line 5. The first extract, which comprises extracting solution (solvent) containing the extracted unsaturated hydrocarbon(s), passes out of the extractor via line 6 and, where the unsaturated hydrocarbon(s) is stripped by a second solvent therefor, the first extract is passed into regenerator 8 via line 9. The second solvent, which is substantially immiscible with the extracting solution, is introduced into said regenerator via line 10. The extracting solution of the first extract, flowing countercurrently to the second solvent, is stripped of the unsaturated hydrocarbon(s), then passes out of the regenerator via line 11, and is recycled to the extractor via lines 11, 12 and 4. The second or stripping solvent containing the unsaturated hydrocarbon(s) passes from the regenerator via lines 14 and 15, through heat exchanger 16, and into a suitable stripper 18 fitted with heating means 19, such as a steam coil or the like. The unsaturated hydrocarbon(s) is stripped from the second solvent and passes from the stripper via line 20, and may be stored or may be otherwise treated, e. g., reacted to form derivatives thereof. The regenerated second solvent is recycled from the stripper into the regenerator via line 21, heat exchanger 16, cooler 22, if desired (which may be operated by any convenient means, such as by cooling with water), and line 10. When necessary or desirable, additional second solvent may be introduced into the system via lines 7 and 10.

When a second solvent is not employed, and the unsaturated hydrocarbon(s) is stripped from the extracting solution by heat, the regenerator 8 is by-passed, the extracting solution passing from the extractor 1 via lines 6 and 15, through heat exchanger 16, and into the stripper 18, where the unsaturated hydrocarbon(s) is stripped by heat, and leaves the stripper via line 20. The regenerated extracting solution is recycled from the stripper to the extractor via line 21, heat exchanger 16, cooler 22, and lines 13, 12 and 4. When it is necessary or desired to adjust or change the composition of the extracting solution, silver salt, water and phenol may jointly or individually be introduced into the extracting solution via lines 22, 23, 24, 25, 26 and 27.

Various modifications in the above-described apparatus and process may of course be employed, such as recycling the raffinate through at least a portion of the extractor in order to obtain an especially pure raffinate. For purposes of simplicity, pumps, temperature controls, control means, additional heat exchangers, and the like, the proper placement of which is evident to those skilled in the art, have been largely omitted.

The main object of the present invention, the separation of unsaturated from less unsaturated hydrocarbons, has been described. It has also been found that the present invention may be employed to separate various classes of olefins. Thus, cyclic olefins are selectively absorbed from non-cyclic olefins, and olefins having the double bond in the alpha position are selectively absorbed from those wherein the double bond is in a different position, such as the beta position, while methyl and higher alkyl substituents on carbon atoms attached to the olefinic bond somewhat reduces selectivity. For example, cyclopentane is absorbed selectively over straight chain 5 carbon atom olefins, 5 carbon atom olefins having the double bond in the alpha position are absorbed selectively over those with the double bond in the beta position, while a methyl substituent on a carbon atom involved in the olefinic bond somewhat decreases selectivity.

By carrying out the process of the present invention, as herein described, surprisingly large amounts of olefin are absorbed per unit of solvent, which olefin may be easily recovered in substantially pure form. The extracting solution, after removal of the olefin, may be recycled in the process, and is surprisingly stable, only small losses of silver and phenol occurring. The stability of the absorbing solutions of the present invention is considered to be a significant improvement over processes employing silver salts for olefin extraction heretofore known. As illustrative of this stability, the same solution was employed for extraction of olefins 6 times, the solution being regenerated by distillation of the olefin after each extraction. The average loss of silver amounted to only about 0.002% of the silver in the original solution per extraction, and practically all of this loss was sustained in the desorption operation. Regeneration of the solution by extraction of the olefin with a solvent substantially immiscible in the solution practically completely eliminates silver loss. The loss of silver in processes involving aqueous silver nitrate solutions is much greater, and usually renders such processes commercially uneconomical. For example, with aqueous silver nitrate solutions, the loss of silver is about 0.06% or higher of silver in the original solution per extraction.

A further important embodiment of the present invention is to provide for the storage and transportation of unsaturated hydrocarbons. Since the lower unsaturated hydrocarbons are gases at ordinary temperatures, and expand with increasing temperatures, it has been customary to employ strong and necessarily heavy containers for their storage and transportation. Due to the great solubility of unsaturated hydrocarbons in solutions of silver salts of sulfonated aromatic compounds in water and phenol, as herein described, such unsaturated hydrocarbons may conveniently be stored and transported while dissolved in the said solutions. For example, a solution of silver phenol sulfonate in phenol and water may be placed in a suitable container, and a lower olefin, i. e., an olefin that is gaseous at ordinary temperatures and pressures, is introduced thereinto. It is usually advantageous to store the gas at a somewhat elevated pressure, since more will be dissolved thereby. The compositions of the absorbing solutions may be the same as those used for the separation of unsaturated hydrocarbons as herein described. Pressures up to about 10 atmospheres generally are suitable, though higher pressures may be employed if desired. When it is desired to recover the gas, it may be easily removed from the solution by heating and/or reducing the pressure, or by extracting with a solvent therefor which is immiscible in the solution. Solutions of unsaturated hydrocarbons in the solvents of the present invention, therefore, constitute new and useful compositions of matter.

Various modifications of the present invention, as herein described, may be employed, such as recycling the extracted unsaturated hydrocarbon in order to obtain an especially purified product. This modification is especially desirable where a more unsaturated hydrocarbon is separated from a less unsaturated hydrocarbon, since, although the more unsaturated hydrocarbon is preferentially extracted, some of the less unsaturated will be also extracted, and recycling is desirable in order to obtain substantial purity of the product. These and other modifications are within the scope of the present invention.

The following examples illustrate the present invention, which is not to be considered as limited thereby:

EXAMPLE I

Pentene-1 was extracted from mixtures thereof with isopentane by contacting the mixtures with solutions of silver phenolsulfonate, phenol and water of varying compositions. The weight ratio of the silver salt to phenol was varied from about 0.4 to about 2.7, while the water content was varied from about 6% to about 42% by weight of the absorbing solution, and the composition of the hydrocarbon mixture was varied from a ratio of about 30 to 70 to about 90 to 10% by volume pentene-1 to isopentane. Olefin absorption and purity were generally surprisingly high. For example, with a weight ratio of silver phenolsulfonate to phenol of 0.41 and 6.2% by weight water, pentene-1 of good purity was absorbed from the above-indicated mixtures thereof, respectively, to the extent of from about 9.5 to about 29% by volume of the solvent. At a weight ratio of silver phenolsulfonate to phenol of 2.66 and 36.4% by weight water, pentene-1 was absorbed to an extent of from about 6 to about 17, the purity always being over 90%, and usually about 95%. At intermediate weight ratios of silver phenolsulfonate to phenol and water concentration, comparably high absorption and purity, which in some instances was 100%, were obtained.

EXAMPLE II

A catalytically cracked gasoline consisting of a mixture of 5 carbon atom hydrocarbons containing 41.8% by volume olefins and 58.2% by volume paraffins was contacted with solutions of silver phenolsulfonate, phenol and water at 50° F. to 80° F. The compositions of the absorbing solutions and results obtained are shown in Table I.

TABLE I

Absorption of olefins in aqueous-phenolic silver phenol sulfonate

| Solvent Composition, percent by weight | | | Weight Ratio AgPS:Phenol | Olefin absorption, percent by volume of solvent | | | |
|---|---|---|---|---|---|---|---|
| AgPS [1] | Phenol | Water | | 50° F. | 60° F. | 70° F. | 80° F. |
| 38 |  | 62 |  |  | 3.4 |  | 1.8 |
| 31.9 | 51.9 | 16.2 | 0.6 |  | 6.8 |  | 6.3 |
| 41.2 | 23.7 | 35.1 | 1.7 |  | 4.9 |  | 4.4 |
| 31.4 | 52.4 | 16.2 | 0.6 | 7.6 |  |  |  |
| 24.3 | 40.8 | 34.9 | 0.6 | 5.2 |  |  |  |
| 37.2 | 35.4 | 27.4 | 1.05 | 6.2 |  |  |  |
| 11.1 | 66.7 | 22.2 | 0.17 |  |  | 5.7 |  |
| 18.2 | 58.1 | 23.7 | 0.3 |  |  | 5.6 |  |

[1] Silver phenolsulfonate.

The data in Table I demonstrate the high absorption of olefins from mixtures thereof with paraffins obtained by contacting such mixtures with the solvents of the present invention, and show the marked value of the presence of phenol in said solvents.

EXAMPLE III

A catalytically cracked gasoline consisting of a mixture of 5 carbon atom hydrocarbons containing 41.8% by volume olefins and 58.2% by volume paraffins was contacted with solutions of silver phenolsulfonate, phenol and ethylene glycol at 60° F. and at 80° F. The compositions of the absorbing solutions and results obtained are shown in Table II.

TABLE II

*Olefin absorption by solutions of silver phenol sulfonate in phenol and ethylene glycol*

| Solvent Composition, percent by weight | | | Weight Ratio AgPS:Phenol | Olefin Absorption, percent by volume of solvent | |
|---|---|---|---|---|---|
| AgPS [1] | Phenol | Ethylene Glycol | | 60° F. | 80° F. |
| 34.2 | | 65.8 | | 2.5 | 1.7 |
| 28.6 | 39.5 | 31.9 | .73 | 5.1 | 5.4 |
| 23.8 | 26.5 | 49.6 | .90 | 4.0 | 3.7 |
| 19.4 | 64.0 | 16.6 | .30 | 7.2 | 7.0 |
| 14.0 | 46.2 | 39.8 | .30 | 4.0 | 3.8 |

[1] Silver phenolsulfonate.

The data in Table II demonstrate the high absorption of olefins from mixtures thereof with paraffins in accordance with the present invention, and especially the value of the presence of relatively large amounts of phenol as compared with ethylene glycol.

The invention claimed is:

1. A process for the separation of olefins from paraffins which comprises contacting a fluid hydrocarbon mixture containing olefinic and paraffinic hydrocarbons with a solution of silver phenolsulfonate in water and phenol wherein the weight ratio of silver phenolsulfonate to phenol is from about 0.6 to about 2, and containing from about 5% to about 30% by weight of water.

2. A process for the separation of olefins from paraffins which comprises contacting a fluid hydrocarbon mixture containing olefinic and paraffinic hydrocarbons with a solution of silver phenolsulfonate in water and phenol wherein the weight ratio of silver phenolsulfonate to phenol is from about 0.3 to about 4, and containing from about 3% to about 50% by weight of water.

3. A process for the separation of olefins from paraffins which comprises contacting a fluid hydrocarbon mixture containing olefinic and paraffinic hydrocarbons with a solution of silver phenolsulfonate in water and phenol wherein the weight ratio of silver phenolsulfonate to phenol is from about 0.3 to about 4.

4. A process for the separation of olefins from paraffins which comprises contacting a fluid hydrocarbon mixture containing olefinic and paraffinic hydrocarbons with a solution of silver phenolsulfonate in water and phenol.

5. A process for the separation of olefins from paraffins which comprises contacting a fluid hydrocarbon mixture containing olefinic and paraffinic hydrocarbons with a solution of a silver salt of a sulfonated aromatic compound in water and phenol.

6. A process for the separation of unsaturated hydrocarbons from a hydrocarbon mixture containing them which comprises contacting said hydrocarbon mixture with a solution of a silver salt of a sulfonated aromatic compound in water and phenol.

7. A process for the separation of olefins from paraffins which comprises contacting a fluid hydrocarbon mixture containing olefinic and paraffinic hydrocarbons with a solution of silver phenolsulfonate in ethylene glycol and phenol wherein the weight ratio of silver phenolsulfonate to phenol is from about 0.3 to about 4, and containing from about 3% to about 50% by weight of ethylene glycol.

8. A process for the separation of olefins from paraffins which comprises contacting a fluid hydrocarbon mixture containing olefinic and paraffinic hydrocarbons with a solution of silver phenolsulfonate in ethylene glycol and phenol.

9. A process for the separation of olefins from paraffins which comprises contacting a fluid hydrocarbon mixture containing olefinic and paraffinic hydrocarbons with a solution of a silver salt of a sulfonated aromatic compound in ethylene glycol and phenol.

10. A process for the separation of unsaturated hydrocarbons from a hydrocarbon mixture containing them which comprises contacting said hydrocarbon mixture with a solution of a silver salt of a sulfonated aromatic compound in ethylene glycol and phenol.

11. A process for the separation of unsaturated hydrocarbons from an olefinic gasoline which comprises contacting said gasoline with a solution of silver phenolsulfonate in water and phenol.

12. A process for the separation of unsaturated hydrocarbons from an olefinic gasoline which comprises contacting said gasoline with a solution of a silver salt of a sulfonated aromatic compound in water and phenol.

13. A process for the separation of unsaturated hydrocarbons from a hydrocarbon mixture containing the same which comprises contacting said hydrocarbon mixture with a solution of a silver salt of a sulfonated aromatic compound in phenol and a material chosen from the group consisting of water and ethylene glycol.

14. A process for the separation of unsaturated hydrocarbons from a hydrocarbon mixture containing the same which comprises contacting said hydrocarbon mixture with a solution of a silver salt of a sulfonated organic compound in phenol and a material chosen from the group consisting of water and ethylene glycol.

15. A method of storing unsaturated hydrocarbons which comprises passing normally gaseous unsaturated hydrocarbons into a storage vessel containing a solution of a silver salt of a sulfonated aromatic compound in phenol and a material chosen from the group consisting of water and ethylene glycol.

16. A method of storing unsaturated hydrocarbons which comprises passing normally gaseous unsaturated hydrocarbons into a storage vessel containing a solution of a silver salt of a sulfonated aromatic compound in phenol and water.

17. A method of storing unsaturated hydrocarbons which comprises passing normally gaseous unsaturated hydrocarbons into a storage vessel containing a solution of silver phenolsulfonate in phenol and water.

18. A new composition of matter comprising an unsaturated hydrocarbon absorbed in a solution of a silver salt of a sunfonated aromatic compound in phenol and a material selected from the group consisting of water and ethylene glycol.

19. A new composition of matter comprising an olefin absorbed in a solution of silver phenolsulfonate in water and phenol.

MOTT SOUDERS, JR.
FREDERIC A. FRENCH.

REFERENCES CITED

The following references are of record in the file of this patent:

UNITED STATES PATENTS

| Number | Name | Date |
|---|---|---|
| 2,139,000 | Cohen | Dec. 6, 1938 |
| 2,235,119 | Robey | Mar. 18, 1941 |
| 2,391,404 | Friedman et al. | Dec. 25, 1945 |
| 2,395,957 | Brewer | Mar. 5, 1946 |
| 2,407,820 | Durrum | Sept. 17, 1946 |